T861049

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1355

772,436

PROCESS FOR THE PREPARATION OF HEXAMETHYLPHOSPHORTRIAMIDE

Charles Lloyd Gibson and William Terrell Tucker, both of P.O. Box 511, Kingsport, Tenn. 37662

Continuation of applications Ser. No. 539,286, Apr. 1, 1966, and Ser. No. 708,425, Feb. 26, 1968. This application Oct. 31, 1968. Published Apr. 29, 1969

Int. Cl. C07f *9/22, 9/26*

U.S. Cl. 260—551

No Drawing. 7 Pages Specification

A process for the preparation of hexamethylphosphortriamide which comprises reacting at a temperature from 0 to 90° C. phosphorus oxytrichloride with aqueous dimethylamine in the presence of any basic material capable of neutralizing hydrogen chloride.